UNITED STATES PATENT OFFICE.

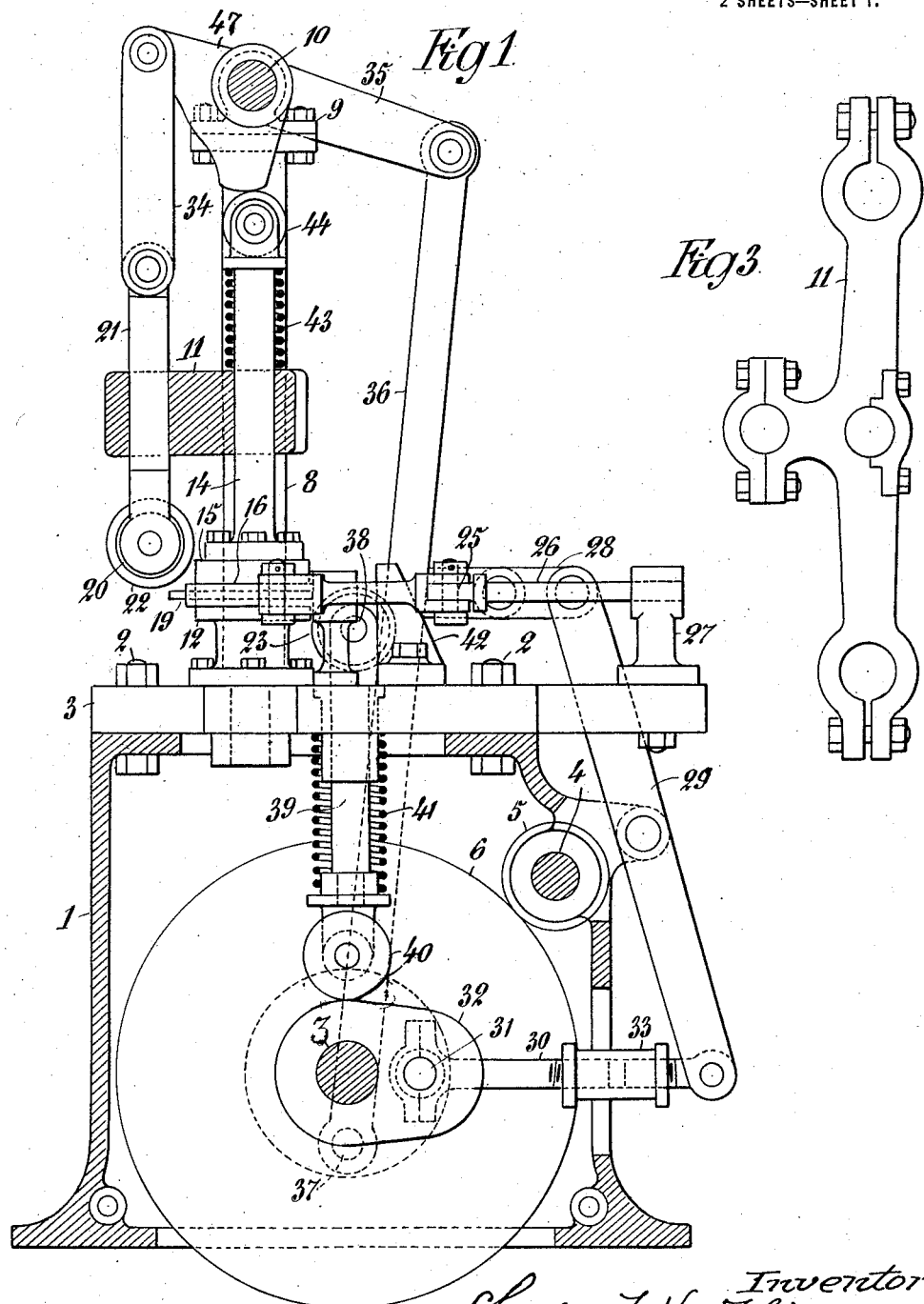

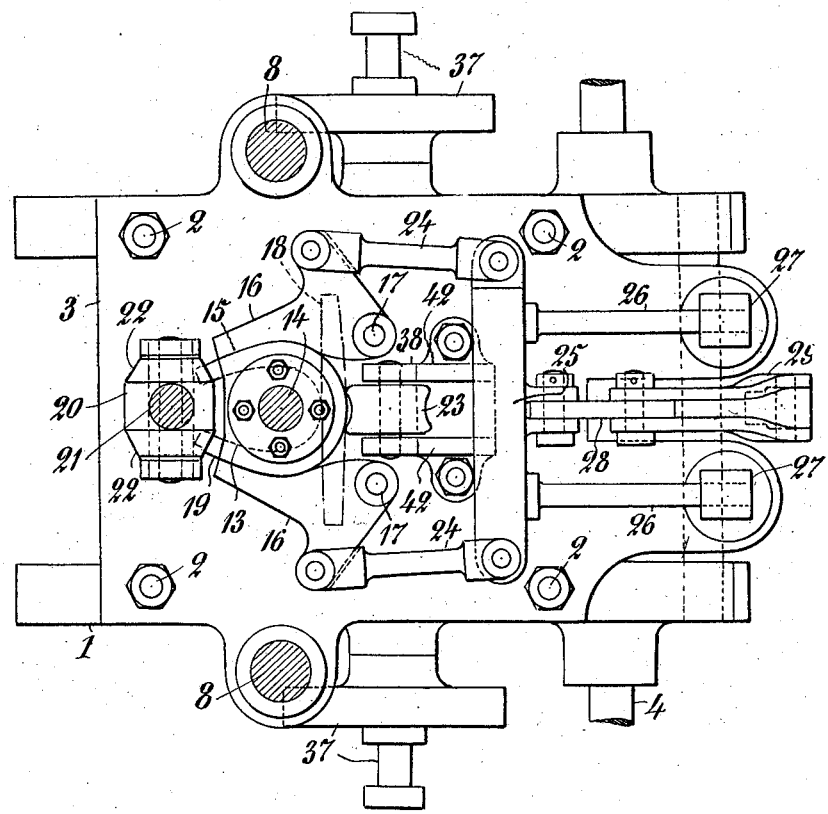

CHARLES FREDERIK VILHELM FLINT, OF COPENHAGEN, DENMARK, ASSIGNOR TO THE FIRM OF DANSK STAALBEHOLDER FABRIK AKTS, OF COPENHAGEN, DENMARK.

MACHINE FOR MAKING HORSESHOES.

1,349,506. Specification of Letters Patent. Patented Aug. 10, 1920.

Application filed September 8, 1919. Serial No. 322,311.

*To all whom it may concern:*

Be it known that I, CHARLES FREDERIK VILHELM FLINT, a subject of the King of Denmark, residing at Copenhagen, Denmark, have invented a new and useful Improvement in Machines for Making Horseshoes; and I do hereby declare the following to be a full, clear, and exact description of the same.

The invention relates to a machine for making horse-shoes the characterstic in which consists in the rod-shaped body of which the horse-shoe is made being retained at one and the same working place while the bending and the operations necessary for the making of the calks and the clipping are carried out, the making can be effected exceedingly quickly so that the machine is excellently adapted for manufacturing in great quantities.

In the drawing is shown an embodiment of the invention.

Figure 1 shows a side-view of the machine partly in section,

Fig. 2 a top-view of the same, certain parts being broken away and

Fig. 3 a detail.

The machine frame 1 carries a thick plate 3 secured by means of bolts 2. In the machine frame is journaled a driving shaft 4 provided with idle and fixed pulleys, not shown, which through a gearing 5, 6 drives the main shaft 7 of the machine. On the plate 3 are secured two heavy pillars 8, at top carrying bearings 9 for a shaft 10. About in the middle of the pillars 8 is secured a guiding member 11 for the members mentioned below serving for bending the calks on the horse-shoe and retaining the same during the various operations. This guiding member 11 is shown separately in Fig. 3.

On the plate 3 right between the pillars 8 is secured an anvil 12 having a raised part 13 the shape of which corresponds to the inner side of a horse-shoe. This part 13 has a plane upper surface. Above the anvil is arranged an upward and downward movable pressing rod 14 carrying a plate 15 with a plane undersurface. As shown in Fig. 2 this plate 15 has a shape corresponding to the outer curved surface of a horse-shoe. When the plate 15 rests against the raised part 13, an outwardly open horse-shoe shaped channel is formed around said part. In producing a horse-shoe the red hot body 18 which is beforehand rolled and which is shown in Fig. 2 in dotted lines, is by means of a pair of tongs arranged on the anvil 12, whereafter the presser-foot 14, 15 passes down and retains the middlemost part of the body. Thereafter two jaws 16 turnable on pivots 17 swing forward and press the body into the said channel around the raised part 13 so as to cause the body to assume the shape of a horse-shoe as shown at 19. The anvil 12 and the plate 15 hereby cause the horse-shoe to get plane under and upper surfaces. In order to cause the body to be pressed right into the said channel the sides of the jaws 16, 16 facing each other have a shape corresponding to the outer side of a horse-shoe. Closer to the pivots 17, 17 the jaws are further shaped in such a manner that the touching points between the jaws and the body move from the middle of the same toward its ends when the body is pressed into the channel. The ends of the body, of which calks are to be produced, will extend beyond the vertical edges of the anvil 12. While the body is still retained by the press foot 14, 15 a roll 20 descends and bends the ends of the body thus producing the calks of the horse-shoe. This roll 20 is journaled on a rod 21 which is guided vertically in the guiding member 11, and the roll has two conical surfaces 22, 22, pressing against the ends of the body. When the calks are produced the roll 20 immediately is raised again. Contemporaneously with the bending of the calks the clipping is made on the front surface of the horse-shoe. In the machine shown this is effected by a roll 23 being pressed against the body from below and owing to its special shape, vide Fig. 2, presses up the body into a clipping. The roll 23 then immediately descends again.

When these operations are carried out and the jaws 16, 16 have been swung back, the press foot is lifted and the produced horse-shoe removed, whereupon a new body is placed on the anvil. The horse-shoe is in known manner provided with nail-groove and nail-holes and may, if wanted, beforehand receive a second pressing.

It has been explained above that the bending of the red hot body into the shape of a horse-shoe is effected by the turnable jaws 16, and that the calks and the clipping are produced by the rolls 20 and 23, respectively, and that the body is retained by the press foot 14, 15.

These members can be driven in any suitable manner desired so as to carry out their operations at the right moments. As regards the shown embodiment the moving mechanisms of these members will be explained below.

The jaws 16 are through connecting rods 24 connected with a forward and backward movable head 25 to which are secured two rods 26 sliding in a guide 27 on the plate 3. The head 25 is through a link 28 connected with the uppermost end of a two-armed lever 29, pivoted on the frame 1, the lower end of which lever by means of a connecting rod 30 is connected with the crank-pin 31 of a double crank 32 secured to the main shaft 7. The length of the connecting rod 30 is adjustable by means of a sleeve 33 to be able to control the extent of swinging of the jaws 16.

The rod 21, in the lowermost forked end of which the roll 20 is journaled, is by a link 34 connected with a cam member 47 secured to the shaft 10. On the shaft 10 is further secured two arms 35 each of which being by means of a connecting rod 36 connected with a crank 37 on the main shaft 7. It will thus be seen that the roll 20 is moved upward and downward once for each revolution of the shaft 7.

The roll 23 is journaled in a fork 38 on a rod 39 guided in the plate 3, the lower end of which rod carrying two rolls 40, one of which only is seen in Fig. 1. These rolls 40 are by a spring 41 arranged around the rod 39 pressed against one of the crank arms of the double crank 32, said arm serving as a cam, shaped in such a manner that the first part of the upward motion of the roll 23 is effected quickly, whereas the last part of the motion during which the roll presses against the body and produces the clipping, is slow. The lateral pressure influencing the roll 23 is received by two brackets 42 secured to the plate 3, on the vertical sides of which slides the fork 38.

The press foot 14, 15 is actuated by a spring 43 keeping a roll 44 on the end of the rod 14 pressed against the circumference of the cam member 47 which has such a shape so as to keep the press foot in its lowermost position while the roll 20 moves downward for bending the calks on the horse-shoe.

The machine can work continually as well as intermittently.

Having thus fully described my invention I claim as new and desire to secure by Letters Patent:

1. A machine for making horse-shoes, comprising means for bending a rod-shaped body into the shape of a horse-shoe, means for the producing of calks at the ends of said body, means for the producing of a clipping substantially at the middle of said body, and means for retaining the rod-shaped body in one and the same working place while being bent and operated upon for the producing of the said calks and clipping.

2. A machine for making horse-shoes, comprising means for bending a rod-shaped body into the shape of a horse-shoe, retaining means for holding the bent body, a reciprocating member adapted to produce calks on the body while being thus held, a second reciprocating member adapted to produce a clipping on the said bent body while being held by the said retaining means, the active strokes of said reciprocating members being performed simultaneously.

3. A machine for making horse-shoes, comprising an anvil having a raised part the peripheral contour of which substantially corresponds to the inner side of a horse-shoe, whereby an outwardly open horse-shoe shaped recess is formed around said raised part, a reciprocating press-foot adapted to bear against the upper surface of the raised part, means including a pair of reciprocating pivoted jaws for pressing a rod-shaped body into the said recess around the raised part of the anvil, a reciprocating member adapted to engage the ends of the said body while being held firmly between the press-foot and thereby forming calks, and another reciprocating member adapted to produce a clipping on the body while the latter is held between the press-foot and the anvil.

4. A machine for making horse-shoes, comprising an anvil, a reciprocating press-foot adapted to coact with the said anvil for holding a rod-shaped body between them, means including a pair of reciprocating pivoted jaws for bending the said body into the shape of a horse-shoe, a reciprocating roller having two conical surfaces adapted to produce calks at the bent horse-shoe shaped body while being held between said anvil and press-foot, and a second reciprocating roller adapted to produce a clipping on the bent body while being held in the said manner, said rollers being adapted to be moved against the bent body from opposite sides.

In testimony whereof I have affixed my signature in presence of two witnesses.

CHARLES FREDERIK VILHELM FLINT.

Witnesses:
C. V. Hogsted,
Viggo Blom.